United States Patent
Velez et al.

(10) Patent No.: US 10,445,283 B2
(45) Date of Patent: Oct. 15, 2019

(54) OUT-OF-BAND MANAGEMENT OF DATA DRIVES

(71) Applicant: LENOVO ENTERPRISE SOLUTIONS (SINGAPORE) PTE. LTD., Singapore (SG)

(72) Inventors: Wilson Velez, Raleigh, NC (US); Luke D. Remis, Raleigh, NC (US); Mark E. Andresen, Cary, NC (US)

(73) Assignee: Lenovo Enterprise Solutions (Singaore) Pte. Ltd., Singapore (SG)

( * ) Notice: Subject to any disclaimer, the term of this patent is extended or adjusted under 35 U.S.C. 154(b) by 60 days.

(21) Appl. No.: 15/666,122

(22) Filed: Aug. 1, 2017

(65) Prior Publication Data

US 2019/0042520 A1 Feb. 7, 2019

(51) Int. Cl.
*G06F 13/42* (2006.01)
*G06F 12/02* (2006.01)
*G06F 13/38* (2006.01)

(52) U.S. Cl.
CPC ...... *G06F 13/4282* (2013.01); *G06F 12/0246* (2013.01); *G06F 13/385* (2013.01); *G06F 2212/7201* (2013.01); *G06F 2213/0026* (2013.01)

(58) Field of Classification Search
CPC ............. G06F 13/4282; G06F 12/0246; G06F 2212/7201; G06F 2213/0026; G06F 13/385
See application file for complete search history.

(56) References Cited

U.S. PATENT DOCUMENTS

| 2007/0011507 A1* | 1/2007 | Rothman | G06F 11/2736 714/718 |
| 2007/0204332 A1* | 8/2007 | Pan | G06F 21/31 726/5 |
| 2008/0222151 A1* | 9/2008 | Mittapalli | H04L 41/00 |
| 2014/0380083 A1* | 12/2014 | Sharifie | G06F 1/06 713/502 |
| 2015/0289405 A1* | 10/2015 | Stewart | H05K 7/183 211/26 |
| 2016/0320985 A1* | 11/2016 | Thomas | G06F 3/0622 |
| 2018/0088958 A1* | 3/2018 | Remis | G06F 9/4401 |

* cited by examiner

*Primary Examiner* — Nimesh G Patel

(57) ABSTRACT

Out-of-band management of data drives including receiving, from a user, a control command targeting a data drive communicatively coupled to a backplane, wherein the data drive is communicatively coupled to the computing device via an interconnect bus; generating, based on the control command, an out-of-band command targeting a baseboard management controller (BMC) communicatively coupled to the backplane, wherein the out-of-band command comprises a data drive location identifier; sending the out-of-band command to the BMC, wherein the BMC, in response, identifies the data drive on the backplane using the data drive location identifier and a cable topology table, and performs the out-of-band command on the data drive; and receiving, from the BMC, a first notification that the out-of-band command has been performed on the data drive identified by the data drive location identifier.

20 Claims, 6 Drawing Sheets

OUT-OF-BAND MANAGEMENT OF DATA DRIVES

BACKGROUND

Field of the Invention

The field of the invention is data processing, or, more specifically, methods, apparatus, and products for out-of-band management of data drives.

Description of Related Art

Data drives may be connected to a host computing system manually by an administrator. Some management solutions depend on the administrator correctly coordinating the drive connections and drive locations on a backplane. In some circumstances, the management solution may store an indication that the drive is installed at a physical location on the backplane that differs from the actual location of the drive on the backplane. This may cause potentially disastrous consequences if the management solution incorrectly identifies a drive for removal and instructs the administrator to remove the incorrectly identified drive. Further, existing management solutions are generally vendor dependent, and are unable to manage data drives from different vendors.

SUMMARY

Methods, systems, and apparatus for out-of-band management of data drives are disclosed in this specification. Out-of-band management of data drives includes receiving, from a user, a control command targeting a data drive communicatively coupled to a backplane, wherein the data drive is communicatively coupled to the computing device via an interconnect bus; generating, based on the control command, an out-of-band command targeting a baseboard management controller (BMC) communicatively coupled to the backplane, wherein the out-of-band command comprises a data drive location identifier; sending the out-of-band command to the BMC, wherein the BMC, in response, identifies the data drive on the backplane using the data drive location identifier and a cable topology table, and performs the out-of-band command on the data drive; and receiving, from the BMC, a first notification that the out-of-band command has been performed on the data drive identified by the data drive location identifier.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION

Figure 1:
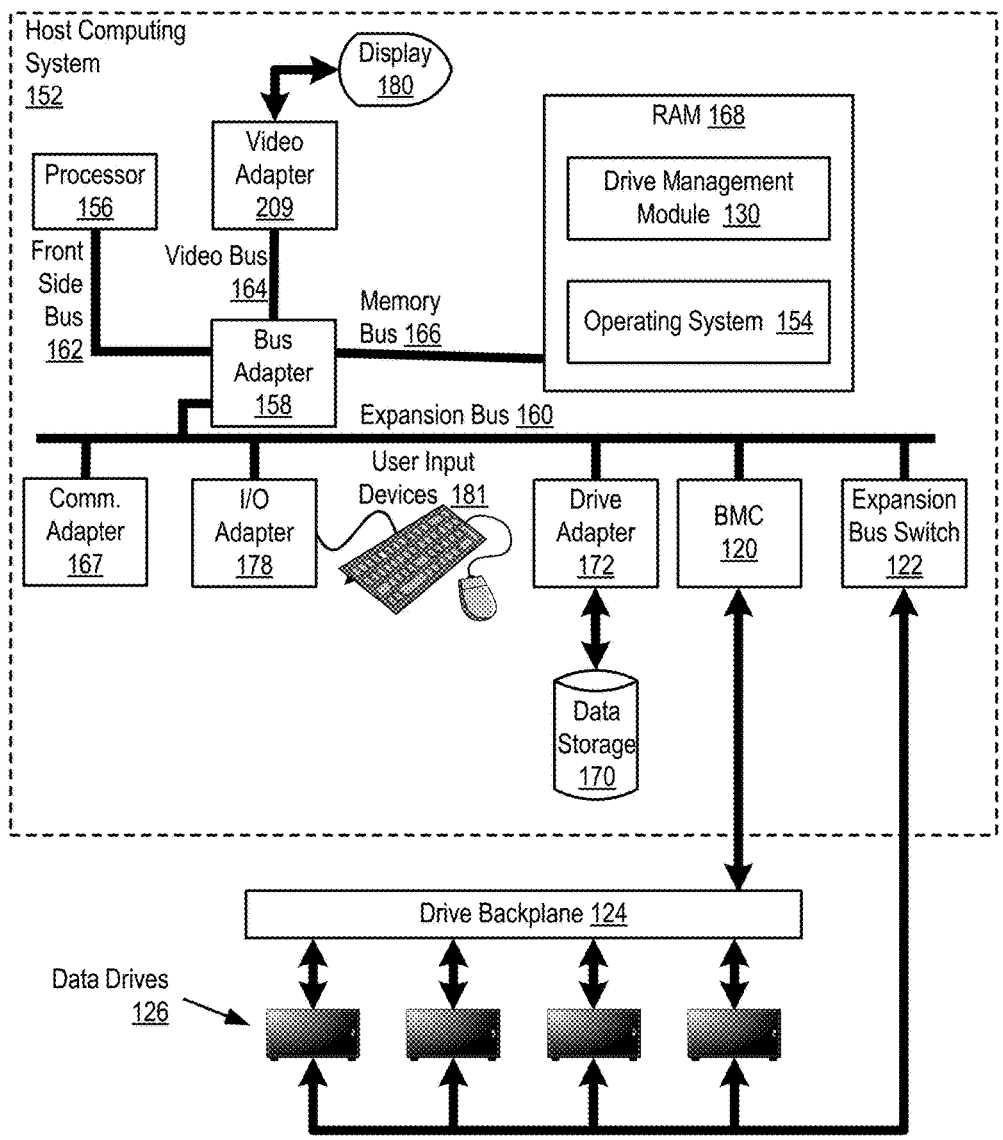
FIG. 1 sets forth a block diagram of an example system configured for out-of-band management of data drives according to embodiments of the present invention.

Exemplary methods, apparatus, and products for out-of-band management of data drives in accordance with the present invention are described with reference to the accompanying drawings, beginning with FIG. 1. FIG. 1 sets forth a block diagram of automated computing machinery comprising an exemplary host computing system (152) configured for out-of-band management of data drives according to embodiments of the present invention. The host computing system (152) of FIG. 1 includes at least one computer processor (156) or 'CPU' as well as random access memory (168) ('RAM') which is connected through a high speed memory bus (166) and bus adapter (158) to processor (156) and to other components of the host computing system (152).

Stored in RAM (168) is an operating system (154). Operating systems useful in computers configured for out-of-band management of data drives according to embodiments of the present invention include UNIX™, Linux™, Microsoft Windows™, AIX™, and others as will occur to those of skill in the art. The operating system (154) in the example of FIG. 1 is shown in RAM (168), but many components of such software typically are stored in non-volatile memory also, such as, for example, on a disk drive (170). Also stored in RAM is a drive management module (130) a module for out-of-band management of data drives according to embodiments of the present invention.

The host computing system (152) of FIG. 1 includes disk drive adapter (172) coupled through expansion bus (160) and bus adapter (158) to processor (156) and other components of the host computing system (152). Disk drive adapter (172) connects non-volatile data storage to the host computing system (152) in the form of data storage (170). Disk drive adapters useful in computers configured for out-of-band management of data drives according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example host computing system (152) of FIG. 1 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice. The example host computing system (152) of FIG. 1 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The example host computing system (152) of FIG. 1 includes a communications adapter (167) for data communications with other computers and for data communications with a data communications network. Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful in computers configured for out-of-band management of data drives according to embodiments of the present invention include modems for wired dial-up communications, Ethernet (IEEE 802.3) adapters for wired data communications, and 802.11 adapters for wireless data communications.

The example host computing system (152) of FIG. 1 includes a baseboard management controller (BMC) (120). The BMC (120) is a microcontroller communicatively coupled to the host computing system (152) that provides out-of-band communication with the drive backplane (124). The term "out-of-band" refers to a communication path that bypasses one or more other communication paths between the host computing system and the backplane (124) or data drives (126). An out-of-band communication path may bypass a main (i.e., in-band) read/write communication path between the host computing system (152) and the data drives (126), such as an expansion bus path (e.g., a peripheral component interconnect communications path). As shown in the exemplary system of FIG. 1, the BMC (120) is coupled directly to the drive backplane (124), bypassing the communication path between the host computing system (152) and the data drives (126) that passes through the expansion bus switch (122). Each data drive (126) may be an interconnect endpoint.

The BMC (120) gathers information from the drive backplane (124) about the data drives (126) coupled to the drive backplane (124). This information may include the physical location of the data drives (126) on the drive backplane (124). The information gathered about the physical locations of the data drives (126) on the backplane may be stored in a cable topology table on the BMC (120). The BMC (120) may also be communicatively coupled to other elements of the host computing system (152). The BMC (120) may receive data, such as error notifications, from a firmware interface on the host computing system (152).

The drive backplane (124) is a group of connection terminals configured to receive the data drives (126). The drive backplane (124) provides out-of-band access and monitoring to the data drives (126) via the BMC (120). The data drives (126) are removable storage drives attached to the drive backplane (124) and at least one other communication path to a host computing system (152). The data drives (126) may be sold-state drives that support the non-volatile memory host controller interface specification.

Figure 2:
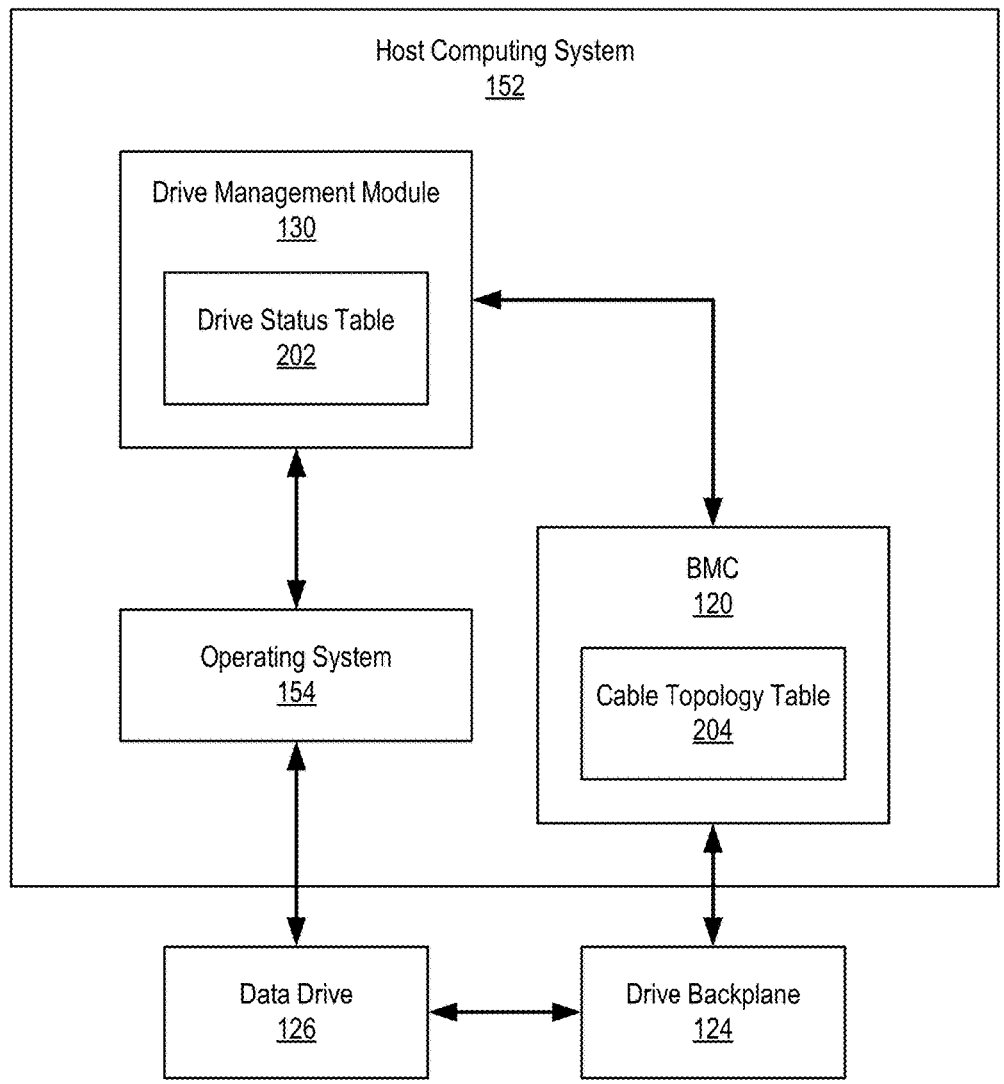
FIG. 2 sets forth a block diagram of an example system configured for out-of-band management of data drives according to embodiments of the present invention.

FIG. 2 shows a block diagram of an example system for out-of-band management of data drives according to embodiments of the present invention. FIG. 2 shows an alternative diagram of a portion of the elements depicted in FIG. 1. As shown in FIG. 2, the exemplary system includes a host computing system (152), a data drive (126), and a drive backplane (124). The host computing system (152) includes a drive management module (130), the operating system (125), and the baseboard management controller (BMC) (120). The drive management module (130) includes a drive status table (202), and the BMC (120) includes a cable topology table (204).

The drive management module (130) is a module that includes software, hardware, or an aggregation of both hardware and software. The drive management module (130) manages a drive status table (202). The drive status table (202) is a data structure that associates each data drive (e.g., data drive (126)) with a status and location on the drive backplane (124). The drive management module (130), or a portion thereof, executes within the operating system (154) and is communicatively coupled to the BMC (120). The drive management module (130) receives control commands from a user and generates out-of-band commands to the BMC (120) based on the control commands. The out-of-band commands may be intelligent platform management interface commands. Although FIG. 2 depicts the drive management module (130) directly coupled to the BMC (120), the communication between the drive management module (130) and the BMC (120) may involve parts of the operating system (154).

The location of the data drive (216) stored in the drive status table (202) may be a slot location in the drive backplane (124). The location may be a location relative to one end of the backplane (e.g., slot 3 being the third slot from the left side of the backplane). The status of each data drive stored in the drive status table (202) may include information such as, for example, the operational state of the drive, including whether the drive is in use or in standby mode, whether an error has been detected for the drive, a history of errors detected for the drive, whether the drive is prepared for removal, whether a visual indicator associated with the data drive is activated, and whether the drive has been disconnected.

The drive management module (130) may provide an interface to a user through which the drive management module (130) receives control commands from a user. The interface may include a visual representation of the information stored in the drive status table (202). For example, the drive management module (130) may present a graphic representation of the drive backplane (124) with each data drive (e.g., data drive (126)) depicted in a location on the representation that corresponds to the physical location of the data drive on the drive backplane (124). Further, each visual representation of each data drive may include a visual indication of the status of that data drive. For example, a color on the visual representation of each drive may indicate whether the drive is operational, non-operational, in standby, currently in use, prepared for removal, disconnected, etc.

Although the exemplary system of FIG. 2 shows the drive management module (130) and the BMC (120) on the same host computing system (152), the drive management module (130) may be on one computing system and communicatively coupled to the BMC (120) on a separate computing system. Further, the BMC (120) may be operational and able to carry out commands while the host computing system is powered down.

The BMC (120) may be aware of the connections between the data drives (e.g. data drive (126)) and the drive backplane (124). The BMC (120) may retrieve connection information from elements on the backplane (124), such as field-programmable gate arrays. The connection information may be correlated and processed to associate each data drive attached to the backplane (124) with a physical location on the backplane (124) and a status of the data drive.

The cable topology table (204) is a data structure generated by the BMC (120) based on data received from the backplane (124). The cable topology table (204) may include information about the physical location and status of each data drive (e.g., data drive 126)) coupled to the drive backplane (124). The information in the cable topology table (204) may be provided to the drive management module (130) and stored by the drive management module (130) in the drive status table (202). The cable topology table (204) and the drive status table (202) may include the same or similar information about the data drives coupled to the backplane (124).

Figure 3:
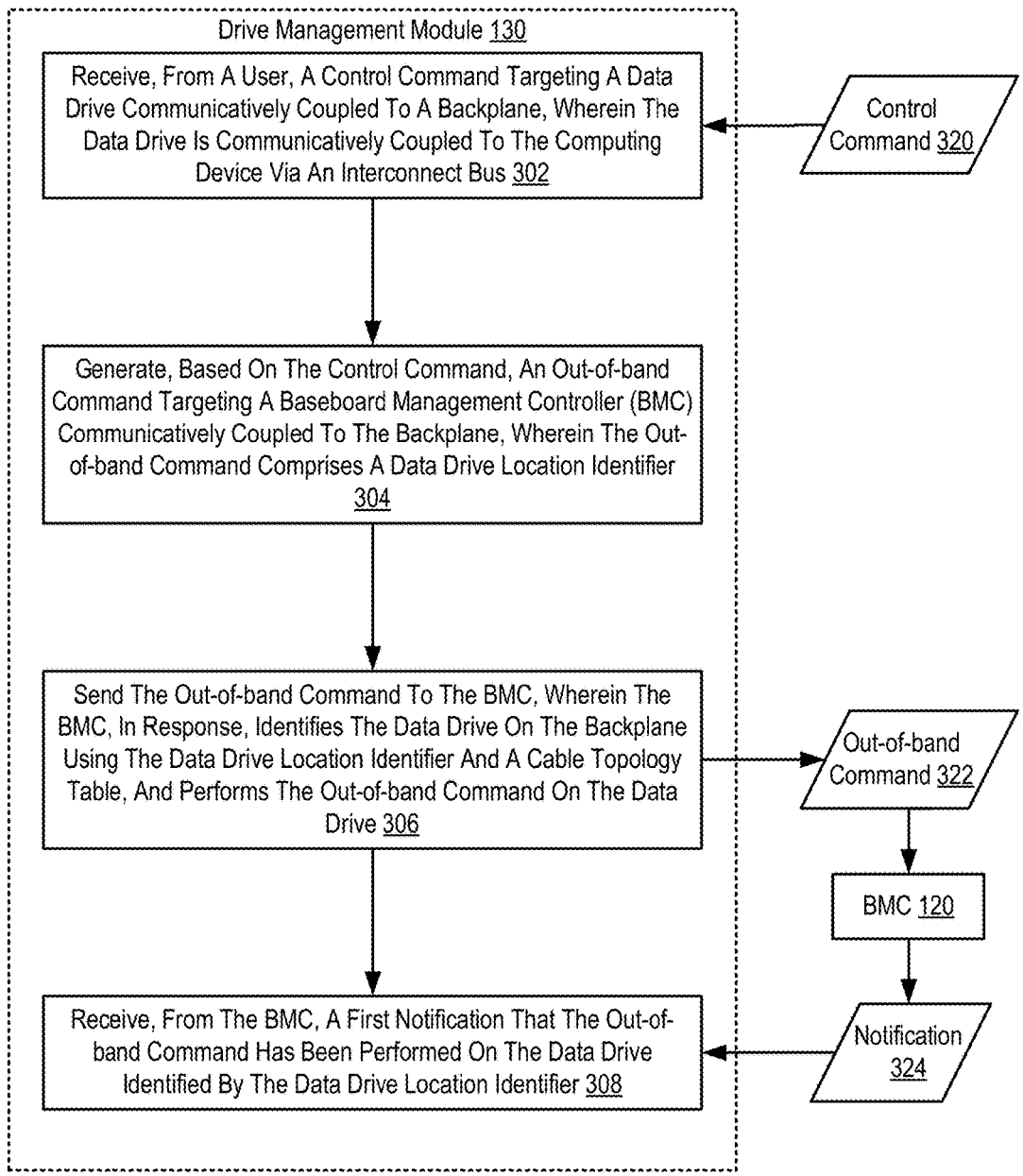
FIG. 3 sets forth a flow chart illustrating an exemplary method for out-of-band management of data drives according to embodiments of the present invention.

For further explanation, FIG. 3 sets forth a flow chart illustrating an exemplary method for out-of-band management of data drives according to embodiments of the present invention that includes receiving (302), from a user, a control command (320) targeting a data drive communicatively coupled to a backplane, wherein the data drive is communicatively coupled to the computing device via an interconnect bus. Receiving (302), from a user, a control command (320) targeting a data drive communicatively coupled to a backplane, wherein the data drive is communicatively coupled to the computing device via an interconnect bus may be carried out by the drive management module (130) detecting input from the user via an interface of the drive management module (130). The computing device may be a host computing system as described in FIGS. 1 and 2.

For example, the user may select a visual representation of a data drive presented by the drive management module (130) and select an option to prepare the data drive for removal. The drive management module (130) may receive the drive and option selection as a control command from the user.

The method of FIG. 3 further includes generating (304), based on the control command (320), an out-of-band command (322) targeting a baseboard management controller (BMC) (120) communicatively coupled to the backplane, wherein the out-of-band command (322) comprises a data drive location identifier. Generating (304), based on the control command (320), an out-of-band command (322) targeting a BMC (120) communicatively coupled to the backplane, wherein the out-of-band command (322) comprises a data drive location identifier may be carried out by the drive management module (130) evaluating the control command and generating the out-of-band command using the content of the control command.

The data drive location identifier received by the drive management module (130) may be a drive designation used by the operating system or within the drive management module (130). The data drive location identifier may be an indication that the user has selected a visual representation of the data drive in a graphical user interface presented by the drive management module (130).

Generating the out-of-band command (322) may include utilizing data stored in a drive status table. The drive management module (130) may search the drive status table for a BMC drive identifier (i.e., a drive identifier decipherable by the BMC (120)) that corresponds to the data drive location identifier received in the control command. Further, the drive management module (130) may search the drive status table for an out-of-band command that corresponds to the control command received by the drive management module (130)

The out-of-band command (322) targets the BMC (120) in that the out-of-band command (322) is generated in a format accepted and decipherable by the BMC (120). The out-of-band command (322) may be configured to be sent via a hardware connection to the BMC (120). For example, the out-of-band command (322) may be an intelligent platform management interface command sent to the BMC (120).

The method of FIG. 3 further includes sending (306) the out-of-band command (322) to the BMC (120), wherein the BMC (120), in response, identifies the data drive on the backplane using the data drive location identifier and a cable topology table, and performs the out-of-band command (322) on the data drive. Sending (306) the out-of-band command (322) to the BMC (120), wherein the BMC (120), in response, identifies the data drive on the backplane using the data drive location identifier and a cable topology table, and performs the out-of-band command (322) on the data drive may be carried out by sending the out-of-band command (322) to the BMC (120) via a hardware connection.

Sending (306) the out-of-band command (322) to the BMC (120) may include routing the out-of-band command through the operating system to the BMC (120). The out-of-band command (322) may be sent to the operating system and forwarded by the operating system to the BMC (120). The out-of-band command (322) may bypass (i.e., not be sent via) at least a portion of the interconnect bus connecting the computing system hosting the operating system and the data drive. Specifically, the out-of-band command (322) may be sent to the BMC (120) without utilizing the interconnect bus between the data drive and the computing system.

Identifying the data drive on the backplane using the data drive location identifier and a cable topology table may include the BMC receiving the out-of-band command (322) (e.g., as an intelligent platform management interface command) and determining the location on the backplane that corresponds to the data drive location identifier in the out-of-band command (322). The received data drive location identifier may match or otherwise correspond to a data drive identifier used by the BMC (120) and stored in the cable topology table.

Performing the out-of-band command (322) on the data drive may include accessing elements on the backplane associated with the location corresponding to the data drive. Performing the out-of-band command (322) on the data drive may include forwarding the out-of-band command (322) to the targeted elements on the backplane. Performing the out-of-band command (322) on the data drive may include preparing the data drive for removal from the backplane and/or the interconnect bus, including gracefully shutting down communications connections and power connections. Performing the out-of-band command (322) on the data drive may include activating a visual indictor associated with the data drive. For example, activating a visual indicator associated with the data drive may include activating a light above the data drive, blinking a light next to the data drive, changing the color of a light below the data drive, etc.

The method of FIG. 3 further includes receiving (308), from the BMC (120), a first notification (324) that the out-of-band command (322) has been performed on the data drive identified by the data drive location identifier. Receiving (308), from the BMC (120), a first notification (324) that the out-of-band command (322) has been performed on the data drive identified by the data drive location identifier may be carried out by receiving the notification as an out-of-band notification bypassing the interconnect bus between the data drive and the computing system.

Figure 4:
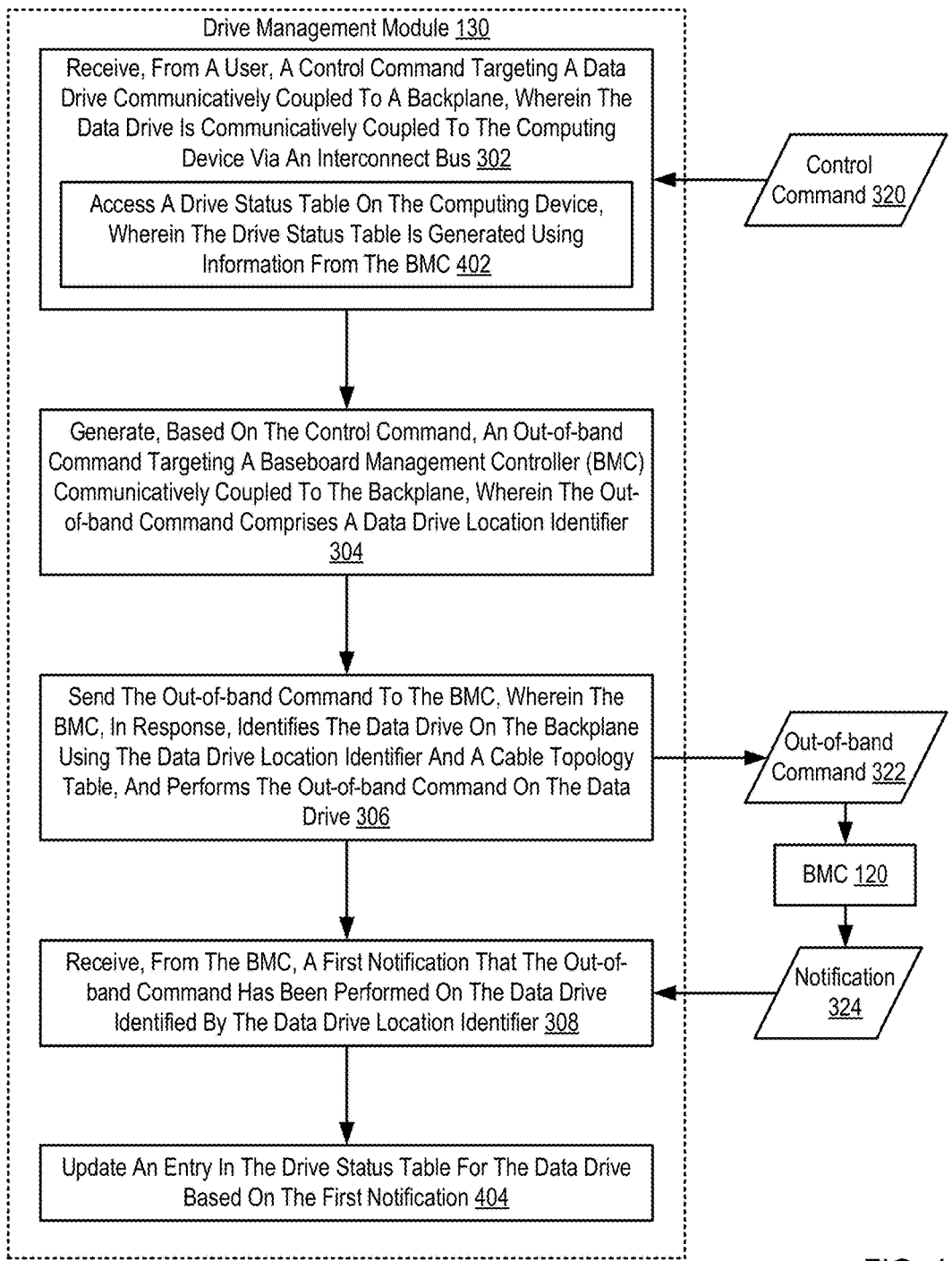
FIG. 4 sets forth a flow chart illustrating an exemplary method for out-of-band management of data drives according to embodiments of the present invention.

For further explanation, FIG. 4 sets forth a flow chart illustrating a further exemplary method for out-of-band management of data drives according to embodiments of the present invention that includes receiving (302), from a user, a control command (320) targeting a data drive communicatively coupled to a backplane, wherein the data drive is communicatively coupled to the computing device via an interconnect bus; generating (304), based on the control command (320), an out-of-band command (322) targeting a baseboard management controller (BMC) (120) communicatively coupled to the backplane, wherein the out-of-band command (322) comprises a data drive location identifier; sending (306) the out-of-band command (322) to the BMC (120), wherein the BMC (120), in response, identifies the data drive on the backplane using the data drive location identifier and a cable topology table, and performs the out-of-band command (322) on the data drive; and receiving (308), from the BMC (120), a first notification (324) that the out-of-band command (322) has been performed on the data drive identified by the data drive location identifier.

The method of FIG. 4 differs from the method of FIG. 3, however, in that receiving (302), from a user, a control command (320) targeting a data drive communicatively coupled to a backplane, wherein the data drive is communicatively coupled to the computing device via an interconnect bus includes accessing (402) a drive status table on the computing device, wherein the drive status table is generated using information from the BMC (120). Accessing (402) a drive status table on the computing device, wherein the drive status table is generated using information from the BMC (120) may be carried out by the drive management module (130) accessing the drive status table as a data structure in memory on the computing system. The drive status table may be stored in volatile or non-volatile memory, and/or may be stored in memory external to the computing device and accessed remotely.

The drive status table may be accessed in order to determine the data drive location identifier for the data drive targeted by the control command. Specifically, the drive status table may include the data drive location identifier decipherable by the BMC (120) that corresponds to the portion of the control command used to identify the data drive. For example, the control command may include graphic coordinates of the visual representation of the data drive presented to the user. The drive management module (130) may use the drive status table to convert the graphic coordinates to the data drive location identifier.

Accessing (402) a drive status table on the computing device, wherein the drive status table is generated using information from the BMC (120) may also be performed in order to present an interface to the user in order to receive the control command. The drive management module (130) may access the drive status table and generate a graphic representation of the data drive, location of the data drive, and drive status using the information in the drive status table.

For example, the drive management module (130) may access the drive status table that includes status information for two data drives, data drive A and data drive B. Data drive A may be at the right end of the backplane and currently be operational. Using this information, the drive management module (130) may generate a data drive graphic at the right side of an application window and place a green square in the center of the data drive graphic to represent the operational state. Data drive B may be at the left end of the backplane and currently have an error associated with the data drive. Using this information, the drive management module (130) may generate a data drive graphic at the left side of an application window and place a red square in the center of the data drive graphic to represent the error state.

The method of FIG. 4 further includes updating (404) an entry in the drive status table for the data drive based on the first notification. Updating (404) an entry in the drive status table for the data drive based on the first notification may be carried out by determining a status update and data drive identifier from the first notification. The drive management module (130) may extract the status update and data drive identifier from the first notification. The drive management module (130) may then locate the entry in the drive status table for the data drive identifier and alter the status in the located entry with the status received in the first notification.

The drive status table may be periodically synchronized with data stored in the cable topology table on the BMC (120). Specifically, the BMC (120) may send out-of-band notifications to the drive management module (130) notifying the data drive management module (130) of status or location changes of the data drives on the backplane. For example, if a new data drive is attached to the backplane, the BMC (120) may detect that activity and generate an out-of-band notification to send to the drive management module (130). The drive management module (130) may then update the drive status table by creating a new entry for the newly attached data drive and store the data drive location identifier in the new entry.

Figure 5:
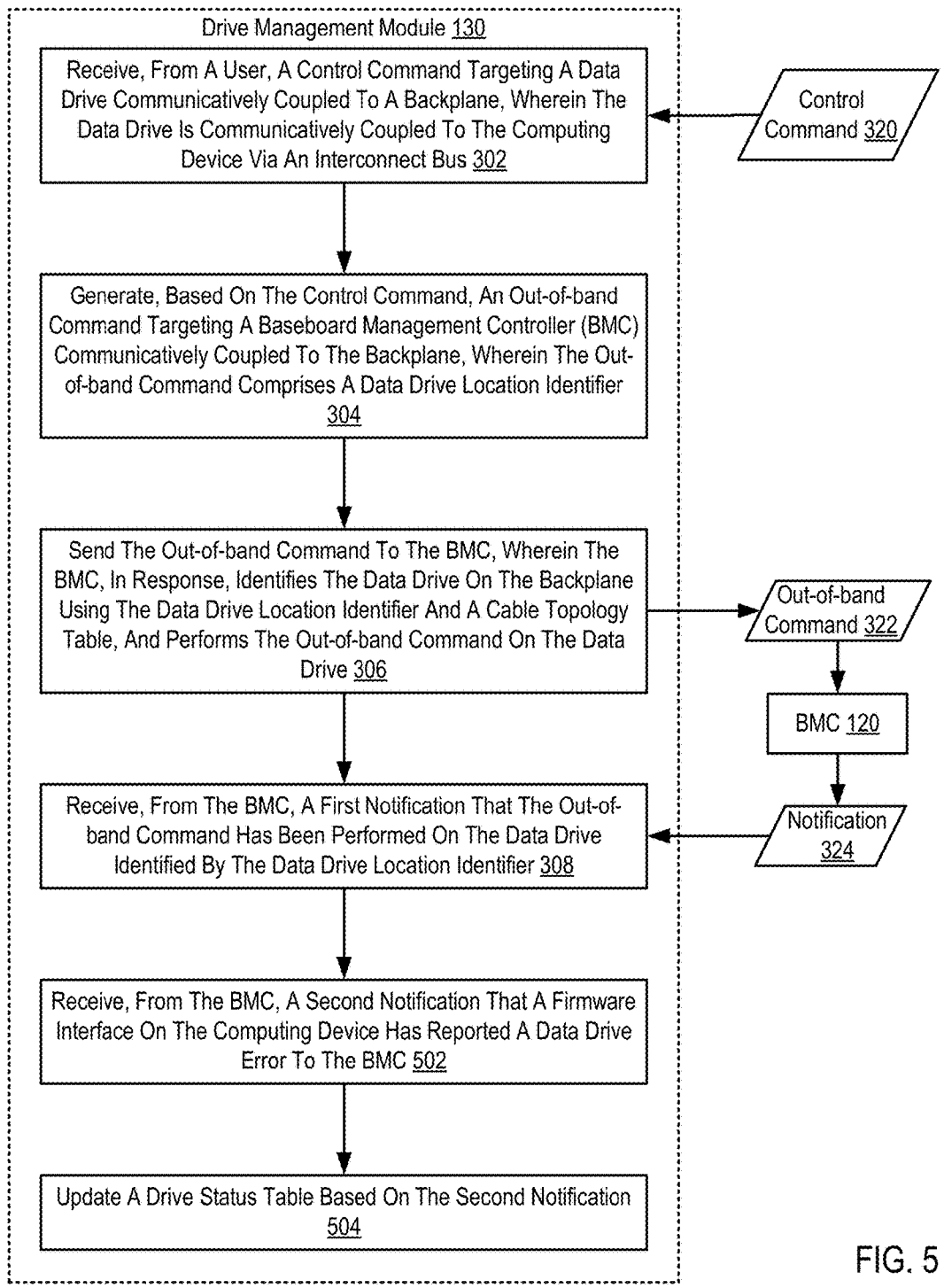
FIG. 5 sets forth a flow chart illustrating an exemplary method for out-of-band management of data drives according to embodiments of the present invention.

For further explanation, FIG. 5 sets forth a flow chart illustrating a further exemplary method for out-of-band management of data drives according to embodiments of the present invention that includes receiving (302), from a user, a control command (320) targeting a data drive communicatively coupled to a backplane, wherein the data drive is communicatively coupled to the computing device via an interconnect bus; generating (304), based on the control command (320), an out-of-band command (322) targeting a baseboard management controller (BMC) (120) communicatively coupled to the backplane, wherein the out-of-band command (322) comprises a data drive location identifier; sending (306) the out-of-band command (322) to the BMC (120), wherein the BMC (120), in response, identifies the data drive on the backplane using the data drive location identifier and a cable topology table, and performs the out-of-band command (322) on the data drive; and receiving (308), from the BMC (120), a first notification (324) that the out-of-band command (322) has been performed on the data drive identified by the data drive location identifier.

The method of FIG. 5 differs from the method of FIG. 3, however, in that the method of FIG. 5 further includes receiving (502), from the BMC (120), a second notification that a firmware interface on the computing device has reported a data drive error to the BMC (120). Receiving (502), from the BMC (120), a second notification that a firmware interface on the computing device has reported a data drive error to the BMC (120) may be carried out by the drive management module (130) receiving an out-of-band second notification from the BMC (120) indicating that one of the data drives attached to the backplane is the subject of an error reported by the firmware interface. The second notification may include a data drive location identifier and a type of error reported. The error may be generated from a different data drive than the data drive of the first notification.

The root complex of the interconnect may provide the error and a drive identifier to the firmware interface, which in turn may then provide the error and drive identifier to the BMC (120). The BMC (120) may then determine the corresponding data drive based on the drive identifier using the cable topology table. Finally, the BMC (120) may provide the out-of-band second notification to the drive management module (130) with a data drive location identifier of the data drive that is the source of the error.

The method of FIG. 5 further includes updating (504) the drive status table based on the second notification. Updating (504) the drive status table based on the second notification may be carried out by determining a status update and data drive identifier from the second notification. The drive management module (130) may extract the status update and data drive identifier from the second notification. The drive management module (130) may then locate the entry in the drive status table for the data drive identifier and alter the status in the located entry with the status received in the first notification.

Once the drive management module (130) is notified of the error, the drive management module, under user control or automatically without user intervention, may send an out-of-band command to the BMC in response to the error. The out-of-band command may be a command to activate a visual indicator associated with the error-generating data drive.

Figure 6:
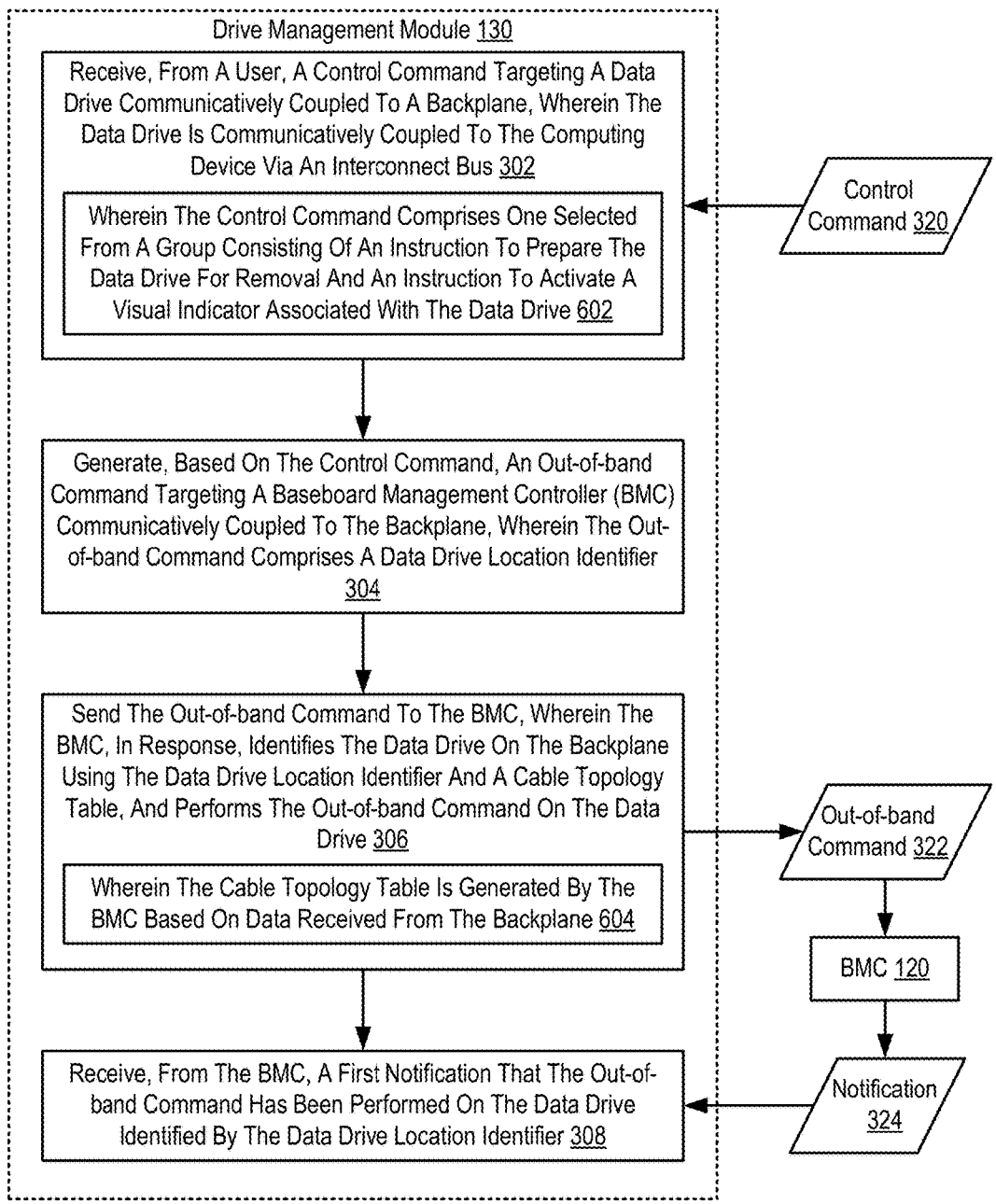
FIG. 6 sets forth a flow chart illustrating an exemplary method for out-of-band management of data drives according to embodiments of the present invention.

For further explanation, FIG. 6 sets forth a flow chart illustrating a further exemplary method for out-of-band management of data drives according to embodiments of the present invention that includes receiving (302), from a user, a control command (320) targeting a data drive communicatively coupled to a backplane, wherein the data drive is communicatively coupled to the computing device via an interconnect bus; generating (304), based on the control command (320), an out-of-band command (322) targeting a baseboard management controller (BMC) (120) communicatively coupled to the backplane, wherein the out-of-band command (322) comprises a data drive location identifier; sending (306) the out-of-band command (322) to the BMC (120), wherein the BMC (120), in response, identifies the data drive on the backplane using the data drive location identifier and a cable topology table, and performs the out-of-band command (322) on the data drive; and receiving (308), from the BMC (120), a first notification (324) that the out-of-band command (322) has been performed on the data drive identified by the data drive location identifier.

The method of FIG. 6 differs from the method of FIG. 3, however, in that receiving (302), from a user, a control command (320) targeting a data drive communicatively coupled to a backplane, wherein the data drive is communicatively coupled to the computing device via an interconnect bus includes wherein (602) the control command comprises one selected from a group consisting of an instruction to prepare the data drive for removal and an instruction to activate a visual indicator associated with the data drive.

In response to receiving a control command that is an instruction to prepare the data drive for removal, the drive management module (130) may generate an out-of-band command (322) that is an intelligent platform management interface instruction to prepare the data drive for removal, and send the instruction to the BMC (120). The BMC (120), in response, may determine the location of the targeted data drive and instruct the data drive and/or the associated backplane elements to gracefully prepare the data drive for removal. Once the instruction has been performed, the BMC (120) may then send an out-of-band notification back to the drive management module (130) that the data drive is prepared for removal. Additionally, the operating system of the computing device may also be notified that the data drive is prepared for removal using the in-band communication path (e.g., through a peripheral component interconnect) between the data drive and the computing device.

In response to receiving a control command that is an instruction to activate a visual indicator associated with the data drive, the drive management module (130) may generate an out-of-band command (322) that is an intelligent platform management interface instruction to activate a visual indicator associated with the data drive, and send the instruction to the BMC (120). The BMC (120), in response, may determine the location of the targeted data drive and instruct the associated backplane elements to activate a visual indicator associated with the data drive, such as turning on a light physically near the data drive. Once the visual indicator has been activated, the BMC (120) may then send an out-of-band notification back to the drive management module (130) that the visual indicator has been activated. The drive management module (130) may then update the drive status table for the data drive to indicate that the visual indicator has been activated. Further, the drive management module (130) may display the data drive in a graphical interface to the user with a corresponding graphic to indicate that the visual indicator has been activated.

The method of FIG. 6 also differs from the method of FIG. 3, however, in that sending (306) the out-of-band command (322) to the BMC (120), wherein the BMC (120), in response, identifies the data drive on the backplane using the data drive location identifier and a cable topology table, and performs the out-of-band command (322) on the data drive includes wherein (604) the cable topology table is generated by the BMC (120) based on data received from the backplane. Generating, by the BMC (120) the cable topology table based on data received from the backplane may be carried out by the BMC (120) retrieving information from other elements on the backplane and creating an association between data drive location identifiers and physical connections and associated elements (e.g., visual indicators) on the backplane. The associations may then be stored in the cable topology table.

In view of the explanations set forth above, readers will recognize that the benefits of out-of-band management of data drives according to embodiments of the present invention include:
- Improving the operation of a computing system by providing a vender-agnostic interface between a host computing system and a data drive that includes advanced interface capabilities, such as a non-volatile memory host controller interface capable data drive, increasing computing system efficiency and functionality.
- Improving the operation of a computing system by providing an out-of-band interface between a computing system and a data drive with more accurate visibility of the physical configuration of interconnect endpoint data drives on a backplane, increasing computing system stability and reliability.

Exemplary embodiments of the present invention are described largely in the context of a fully functional computer system for out-of-band management of data drives. Readers of skill in the art will recognize, however, that the present invention also may be embodied in a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a computer program product. Persons skilled in the art will recognize also that, although some of the exemplary embodiments described in this specification are oriented to software installed and executing on computer hardware, nevertheless, alternative embodiments implemented as firmware or as hardware are well within the scope of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method comprising:
   by program instructions on a computing device,
      receiving, from a user, a control command targeting a data drive communicatively coupled to a backplane, wherein the data drive is communicatively coupled to the computing device via an interconnect bus, wherein the control command comprises graphic coordinates of a visual representation of the data drive;
      determining, based on the graphic coordinates, a data drive location identifier;
      generating, based on the control command, an out-of-band command targeting a baseboard management controller (BMC) communicatively coupled to the backplane, wherein the out-of-band command comprises the data drive location identifier, wherein the data drive location identifier is usable by the BMC with a cable topology table to identify the data drive on the backplane;
      sending the out-of-band command to the BMC for performing the out-of-band command on the data drive identified on the backplane by the data drive location identifier; and
      receiving, from the BMC, a first notification that the out-of-band command has been performed on the data drive identified by the data drive location identifier.

2. The method of claim 1, wherein receiving, from the user, the control command targeting the data drive comprises accessing a drive status table on the computing device, wherein the drive status table is generated using information from the BMC.

3. The method of claim 2, further comprising, by the program instructions on the computing device, updating an entry in the drive status table for the data drive based on the first notification.

4. The method of claim 1, further comprising, by the program instructions on the computing device,
   receiving, from the BMC, a second notification that a firmware interface on the computing device has reported a data drive error to the BMC; and
   updating a drive status table based on the second notification.

5. The method of claim 1, wherein the control command comprises one selected from a group consisting of an instruction to prepare the data drive for removal and an instruction to activate a visual indicator associated with the data drive.

6. The method of claim 1, wherein the cable topology table is generated by the BMC based on data received from the backplane.

7. The method of claim 1, wherein the data drive is a non-volatile memory express data drive.

8. An apparatus comprising a computing device, a computer processor, and a computer memory operatively coupled to the computer processor, the computer memory having disposed within it computer program instructions that, when executed by the computer processor, cause the apparatus to carry out the steps of:
   receiving, from a user, a control command targeting a data drive communicatively coupled to a backplane, wherein the data drive is communicatively coupled to the computing device via an interconnect bus, wherein the control command comprises graphic coordinates of a visual representation of the data drive:
   determining, based on the graphic coordinates, a data drive location identifier:
   generating, based on the control command, an out-of-band command targeting a baseboard management controller (BMC) communicatively coupled to the backplane, wherein the out-of-band command comprises the data drive location identifier, wherein the data drive location identifier is usable by the BMC with a cable topology table to identify the data drive on the backplane;
   sending the out-of-band command to the BMC for performing the out-of-band command on the data drive identified on the backplane by the data drive location identifier; and
   receiving, from the BMC, a first notification that the out-of-band command has been performed on the data drive identified by the data drive location identifier.

9. The apparatus of claim 8, wherein receiving, from the user, the control command targeting the data drive comprises accessing a drive status table on the computing device, wherein the drive status table is generated using information from the BMC.

10. The apparatus of claim 9, wherein the computer program instructions further cause the apparatus to carry out the step of updating an entry in the drive status table for the data drive based on the first notification.

11. The apparatus of claim 8, wherein the computer program instructions further cause the apparatus to carry out the steps of:
   receiving, from the BMC, a second notification that a firmware interface on the computing device has reported a data drive error to the BMC; and
   updating a drive status table based on the second notification.

12. The apparatus of claim 8, wherein the control command comprises one selected from a group consisting of an instruction to prepare the data drive for removal and an instruction to activate a visual indicator associated with the data drive.

13. The apparatus of claim 8, wherein the cable topology table is generated by the BMC based on data received from the backplane.

14. The apparatus of claim 8, wherein the data drive is a non-volatile memory express data drive.

15. A computer program product including a non-transitory computer readable medium, the computer program product comprising computer program instructions that, when executed, cause a computer to carryout the steps of:
   receiving, from a user, a control command targeting a data drive communicatively coupled to a backplane, wherein the data drive is communicatively coupled to the computing device via an interconnect bus, wherein the control command comprises graphic coordinates of a visual representation of the data drive:

determining, based on the graphic coordinates, a data drive location identifier;
generating, based on the control command, an out-of-band command targeting a baseboard management controller (BMC) communicatively coupled to the backplane, wherein the out-of-band command comprises the data drive location identifier, wherein the data drive location identifier is usable by the BMC with a cable topology table to identify the data drive on the backplane;
sending the out-of-band command to the BMC for performing the out-of-band command on the data drive identified on the backplane by the data drive location identifier; and
receiving, from the BMC, a first notification that the out-of-band command has been performed on the data drive identified by the data drive location identifier.

16. The computer program product of claim 15, wherein receiving, from the user, the control command targeting the data drive comprises accessing a drive status table on the computing device, wherein the drive status table is generated using information from the BMC.

17. The computer program product of claim 16, wherein the computer program instructions further cause the computer to carry out the step of updating an entry in the drive status table for the data drive based on the first notification.

18. The computer program product of claim 15, wherein the computer program instructions further cause the computer to carry out the steps of:
receiving, from the BMC, a second notification that a firmware interface on the computing device has reported a data drive error to the BMC; and
updating a drive status table based on the second notification.

19. The computer program product of claim 15, wherein the control command comprises one selected from a group consisting of an instruction to prepare the data drive for removal and an instruction to activate a visual indicator associated with the data drive.

20. The computer program product of claim 15, wherein the cable topology table is generated by the BMC based on data received from the backplane.

* * * * *